United States Patent [19]

Yasunobu et al.

[11] Patent Number: 4,984,174
[45] Date of Patent: Jan. 8, 1991

[54] INFORMATION SERVICE SYSTEM

[75] Inventors: Seiji Yasunobu, Yokohama; Kuniaki Matsumoto, Tokyo, both of Japan

[73] Assignee: Hitachi, Ltd., Tokyo, Japan

[21] Appl. No.: 260,066

[22] Filed: Oct. 20, 1988

[30] Foreign Application Priority Data

Nov. 11, 1987 [JP] Japan ............... 62-283280

[51] Int. Cl.$^5$ ............................ G06F 15/18
[52] U.S. Cl. ............................ 364/513; 364/200; 364/274.6
[58] Field of Search ............... 364/513, 300, 200, 900

[56] References Cited

PUBLICATIONS

Proceedings IECON'84; Tokyo, Japan; Oct. 22–26, 1984; pp. 883–888; Automatic Diagnosing System for the Blast Furnace Operating Conditions; Saito et al.

*Primary Examiner*—Allen R. MacDonald
*Attorney, Agent, or Firm*—Antonelli, Terry, Stout & Kraus

[57] ABSTRACT

An information service system which supplies a predetermined information to a participant to an object system in accordance with predetermined control rules. The information service system includes an information service rule storage unit for transforming intellectual activities regarding information services to the participant into an algorithmic form, and storing the algorithmic form data as an information knowledge base; an information storage unit for storing as an information data base the integral information regarding the object system and the external information such as news, weather predictions and the like; an information service control unit for receiving a condition signal from the object system, calculating on the condition signal in accordance with the information knowledge base, selecting a most suitable information for the participant from the information storage unit in accordance with the calculated result, and outputting the most suitable information; and an information display unit for notifying the system participant of information corresponding to the most suitable information from the information service control unit.

17 Claims, 6 Drawing Sheets

FIG. 6

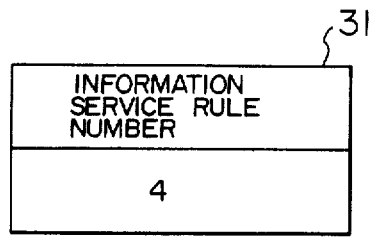

| RULE NUMBER | FIRST ESTIMATION PROPOSITION | SECOND ESTIMATION PROPOSITION | CONTENT OF INFORMATION SERVICE |
|---|---|---|---|
| 1 | IMMEDIATELY AFTER CALL REQUEST ($E_{11}$) | PROPER PREDICTED WAIT TIME ($E_{12}$) | NOTIFY OF ASSIGNED ELEVATOR |
| 2 | SHORT WAIT TIME ($E_{21}$) | SHORT PREDICTED WAIT TIME ($E_{22}$) | NOTIFY OF COMING ELEVATOR |
| 3 | LONG WAIT TIME ($E_{31}$) | SHORT PREDICTED WAIT TIME ($E_{32}$) | ANNOUNCE "SORRY FOR WAITING" AND NOTIFY COMING ELEVATOR |
| 4 | IMMEDIATELY AFTER CALL REQUEST ($E_{41}$) | LONG PREDICTED WAIT TIME ($E_{42}$) | ANNOUNCE "NOW CONGESTED" AND NOTIFY OF ASSIGNED ELEVATOR |

FIG. 7

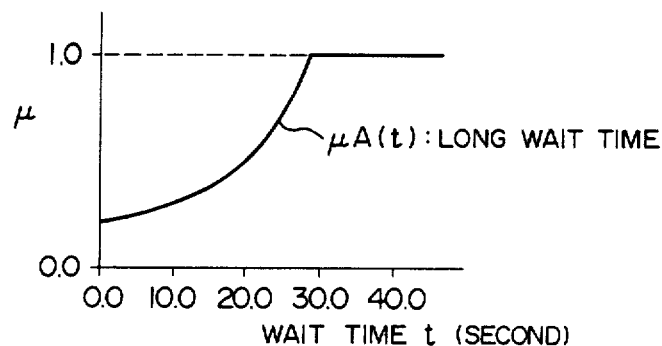

INFORMATION SERVICE SYSTEM

BACKGROUND OF THE INVENTION

The present invention relates to an information service system which provides information service to particular persons and more particularly to an information service system which selects and provides information which is especially important to participants in (users of) an object system.

In recent years, attempts have been made in transportation systems, plants and the like to transform intellectual activities of experts for system driving or controlling into algorithmic forms One of such attempts involves use of a fuzzy control method wherein the subjective ambiguity of people is quantitatively classified into fuzzy sets to determine control instructions. As examples of fuzzy theory controls, a scheme which relies on experts' estimation of system controls has been employed in controlling a cement kiln or in controlling the dose of chemicals to be provided in a water cleaning bed. The outline and applications of fuzzy controls are described in detail in IEEE Spectrum, Vol. 21, No. 8, pp. 26 to 32, Aug. 1984.

The present inventors have proposed a predictive fuzzy control scheme which determines a control instruction based on estimation of control objects sought by experts while using models of the object system, and this scheme is practically applied to automatic train operation and automatic crane operation (U.S. application Ser. No. 488,455, filed on Apr. 25, 1983, entitled "Method and device for stopping vehicle at predetermined position", now abandoned, from which we have filed a continuation U.S. application Ser. No. 127,549 filed on Dec. 2, 1987, both applications being assigned to the same assignee as the present application).

In line with developments of a highly sophisticated information system using new media, it has become important to provide a technology by which information really important to a user of (a participant in) the system is selected among a great amount of information and the selected information is supplied to the user, while aiming at supplying information which is comparable to that a skilled person would supply.

The above-described fuzzy control system aims at optimum control of an object system and gives a display of inferred results, an explanation of causes, and so on to a system participant. However, it does not positively provide information really desired by a system participant.

With conventional information services for an elevator operation system, a train operation system and so on, only a fixed message is supplied to a system participant when the object system reaches a predetermined condition However, such conventional information services are uniform or standardized so that meaningless or inferior information may sometimes be given to the system participant, who accordingly feels uneasy and restless.

SUMMARY OF THE INVENTION

The role played by experts in a control system will be considered In a control system, particularly in a system operating in close connection with a human, there is provided not only a driver or operator of the object system, but also a conductor, guide and other personnel who explain the driving or controlling condition to passengers, all of whom work together to allow the passengers to use the system with mental comfort and ease. Namely, in a train operation system, by way of example, the conductor gives passengers control information including an advance notice of rolling at a switch point, of braking action, and so on, as well as external information including information regarding train transfer, and so on. Thus, the conductor provides information services to passengers at proper times and places. In a control system, such as in plants without expert operators, taking as an example the case where a skilled person drives or controls the system while accompanied by a beginner, the skilled person not only drives the system, but also teaches the beginner how to judge the present system condition and why the next action is to be selected. This invention proposes an information service system which not only transforms intellectual control activities of such a skilled person into a form usable by computers, but also integrates and builds into the system intellectual activities regarding information services related to the control activities.

It is therefore a first object of the present invention to provide an information service system which is capable of supplying optimum information to a participant in accordance with the object system condition and control condition.

It is a second object of the present invention to provide an information service system wherein intellectual activities of experts regarding information services are integrated in the form of a fuzzy knowledge base to provide most suitable information services to a system participant.

The above first and second objects can be achieved by the provision of an information service system which supplies predetermined information to a participant in an object system in accordance with predetermined control rules, which system includes an information service rule storage unit for transforming intellectual activities regarding information services to the participant in an algorithmic form and storing the algorithmic form data as an information knowledge base; an information storage unit for storing as an information base the internal information regarding the object system and external information, such as news, weather predictions and the like; an information service control unit for fetching the condition of the object system, calculating the condition in accordance with the information knowledge base, selecting most suitable information for the participant from the information storage unit in accordance with the calculated result, and outputting the most suitable information; and an information display for notifying the system participant of the information corresponding to the most suitable information from the information service control unit.

According to a preferred embodiment of the information service system, the satisfaction degree of an estimation standard which a human has felt subjectively is obtained based on measured values of present and past conditions Based on a service rule determined by a human through past information service experiences while taking the estimation standard into consideration, a most suitable information service for a particular situation as would be sought by a human is given.

These and other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 6 shows the content of an information service rule table stored in an information service rule storage; and FIG. 7 shows an example of a membership function of an information service proposition.

DESCRIPTION OF THE PREFERRED EMBODIMENTS

An embodiment of the present invention will be described in detail with reference to the accompanying drawings.

Figure 1:
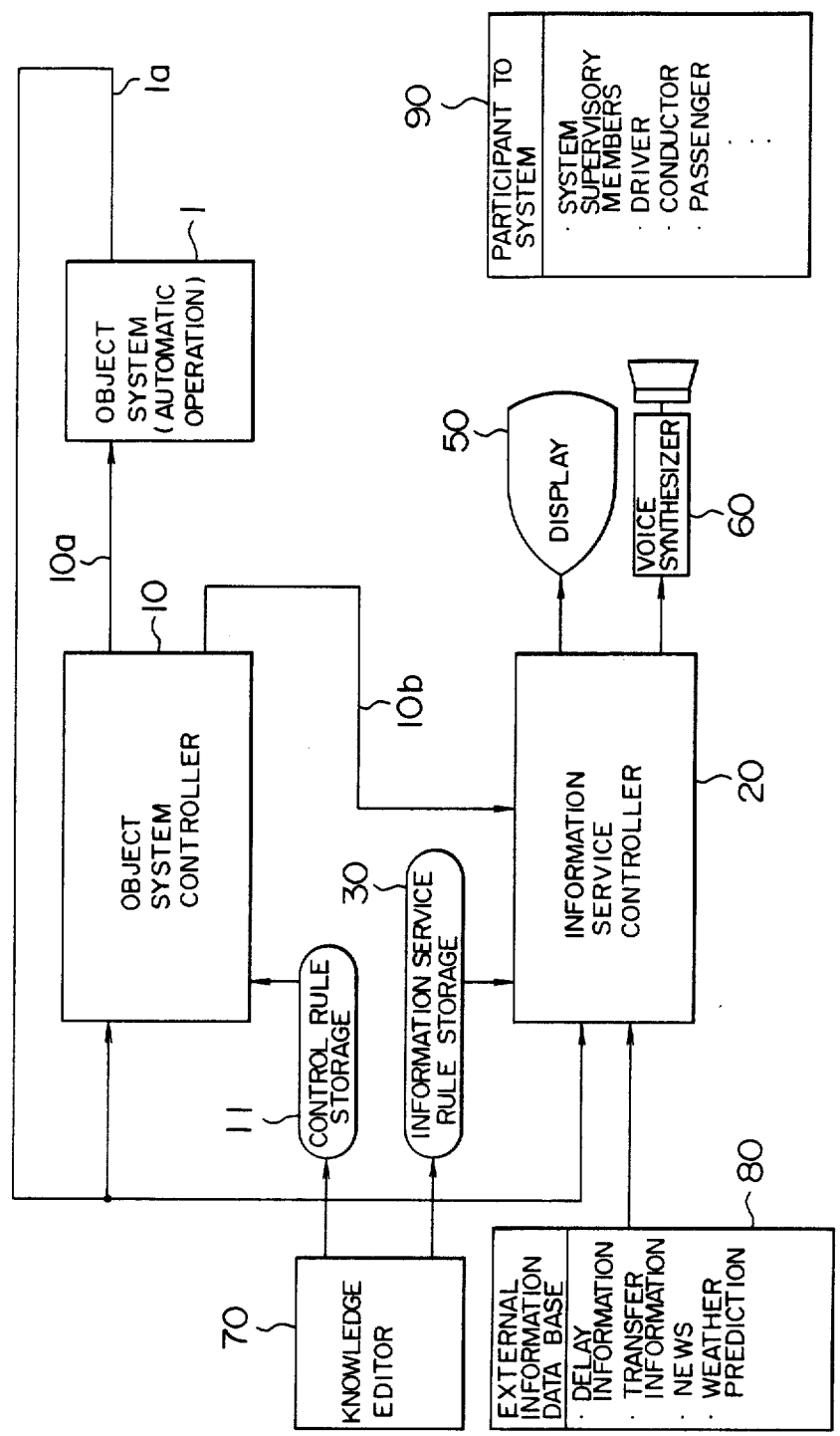
FIG. 1 shows the overall configuration of an embodiment of the information service system according to the present invention.

FIG. 1 shows an embodiment of the information service system according to the present invention.

The system is broadly classified into three units including an object system controller, an information service controller and a knowledge editor. According to the information service system, the object system is automatically driven while considering proper service information for passengers and crews by using each rule made up in dependence upon the knowledge of a skilled person and the like.

The object system 1 may be one of various control systems, such as an elevator-group supervisory system, train operation system, process control system and the like. In this embodiment, an elevator-group supervisory system is used by way of example.

The object system 1 is coupled to an object system controller 110 and information service controller 20 to both of which it supplies a system-condition signal 1a indicating the condition of the object system 1. The object system 1 and object-system controller 10 constitute a closed loop. The object-system controller 10 supplies a control instruction signal 10a corresponding to the system condition to the object system 1 for control of the latter.

A knowledge editing portion 70 edits a fuzzy knowledge base by introducing empirical rules regarding the system control and information service into the fuzzy knowledge base. The edited respective knowledge base is supplied to a control rule storage 11 and information service rule storage 30 to be stored therein. The control rule storage 11 is coupled to the object system controller 10 which controls the object system 1 in accordance with control rules of the storage 11.

The information service controller 20 is coupled to a voice synthesizer 60, display 50, object system controller 10, information service rule storage 30, object system 1 and external information data base 80. The information service controller 20 receives a control condition signal 10b and system condition signal 1a to arithmetically process them in dependence upon rule information supplied from the information service rule storage 30, and notifies a system participant 90 of optimum information from the external information data base 80 by means of the display 50 and/or voice synthesizer 60.

Figure 2:
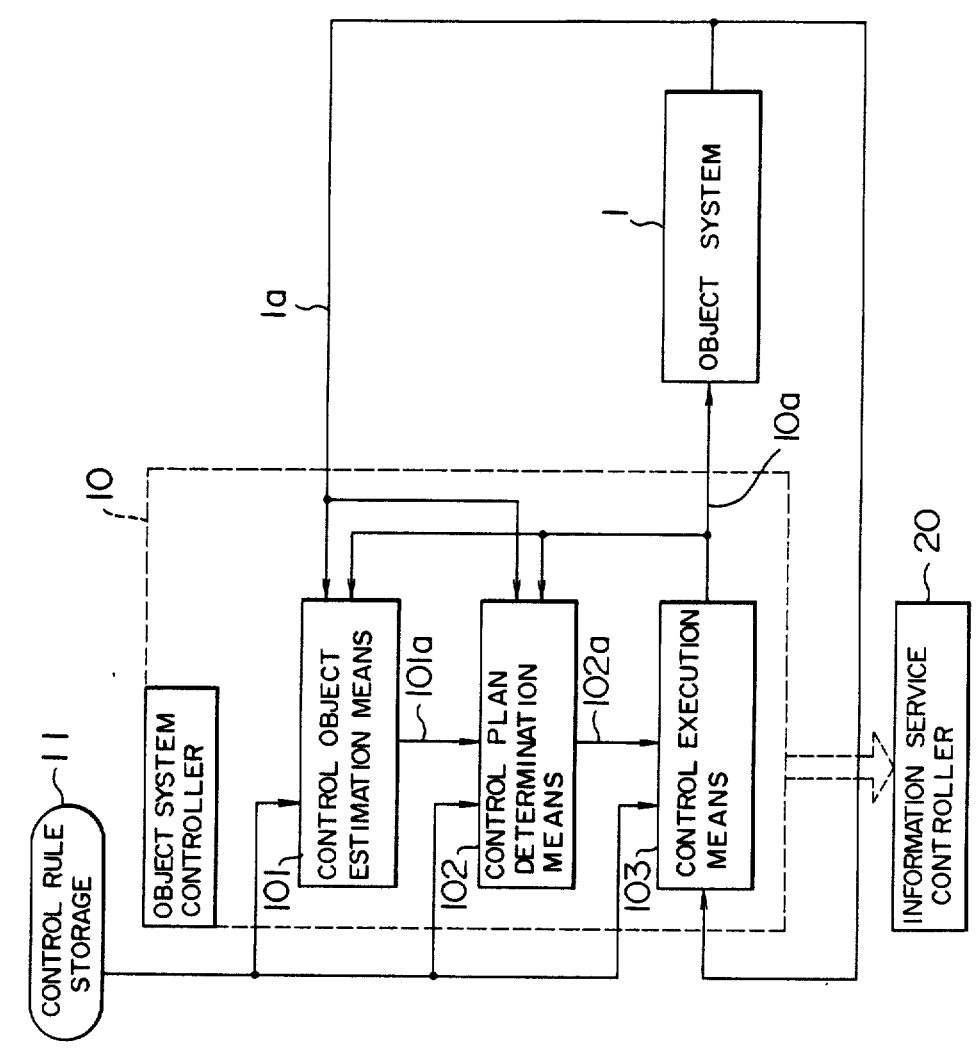
FIG. 2 shows details of the object system controller 10 shown in FIG. 1.

FIG. 2 shows details of the object system controller 10. The object system controller 10 transforms empirical rules derived from persons' individual or fragmentary control knowledge into fuzzy control rules, by making fuzzy sets representative of their subjective grasp or comprehension of object system conditions, models of dynamic characteristics, and fuzzy estimation of control purposes, to allow control of the object system 1 by using the fuzzy control rules. Stored in the control rule storage 11 are qualitative characteristics, in the form of software, of past experiences of experts for the control of the object system. The object system controller 10 determines for a very important situation a control plan to satisfy a primary control purpose on the basis of the control rules. Generally, a control instruction is determined in accordance with the determined control plan, and a response to past control instructions is checked from time to time to infer the present characteristic of the object system 1. The object system controller 10 hierarchically organizes the control rules as in the following:

(a) Control object estimation means 101 receives the object system condition signal 1a and control instruction u(t) 10a and checks the present response of the object system 1 by comparing it with past experienced responses. If the structure or constitution of the object system 1 or system parameters 101a have changed, such change is recognized by the control object estimation means 101.

(b) Control plan determination means 102 discriminates and determines an optimum control plan 102a by predicting the result of carrying out a presently executable control plan, based on past experiences, from the present system condition 1a and system parameters 101a.

(c) Control execution means 103 determines and executes a control instruction 10a in a conditioned response to the present condition, in dependence upon the determined control plan 102a.

Figure 3:
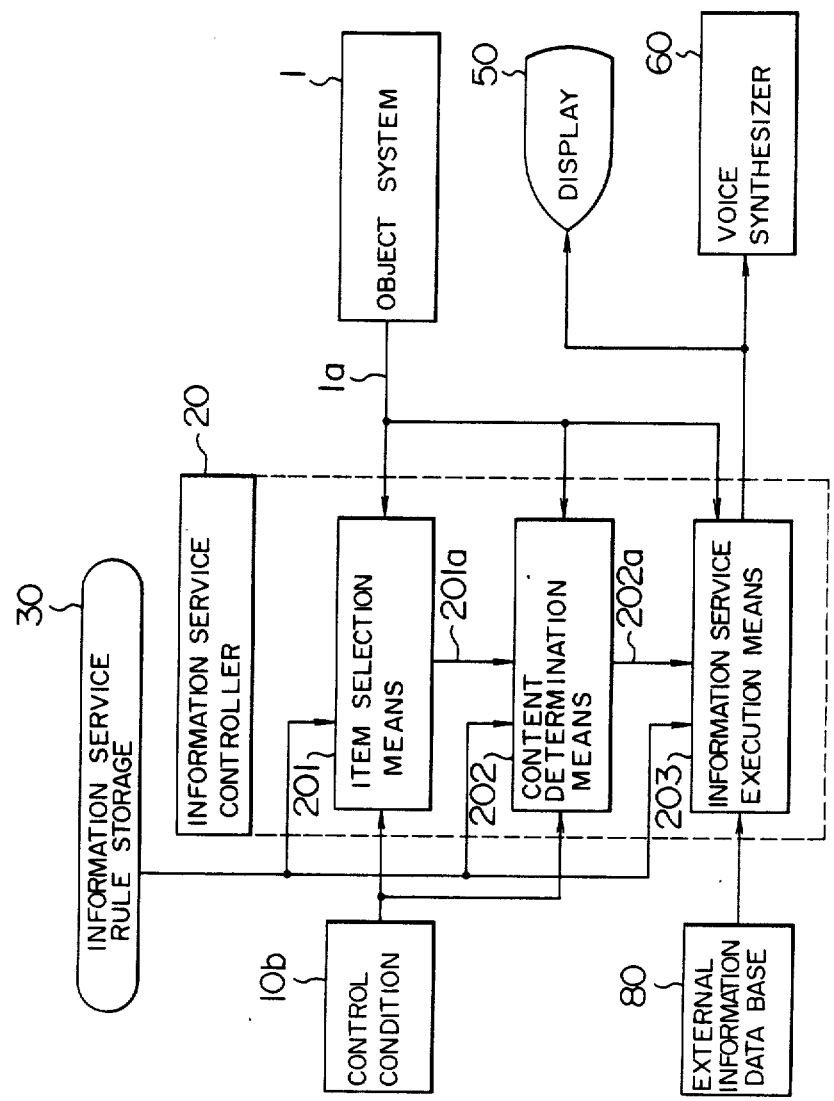
FIG. 3 shows details of the information service controller 20 shown in FIG. 1.

FIG. 3 shows details of the information service controller 20.

Similar to the object system controller 10, the information service controller 20 transforms empirical rules derived from persons' individual information-service knowledges into fuzzy information-service rules, to allow supply of an information service to a participant 90 to the object system 1, by using the fuzzy information service rules. The information service controller 20 selects an information service item to be provided for the present system condition 1a, determines the particular content and expression of the selected information service item, and supplies the information by means of the display or the voice synthesizer while considering timings when the determined information and fixed external information are outputted. The information service controller 20 hierarchically organizes the service rules as in the following:

(a) Item selection means 201 is started and actuated at the occurrence of an event or a control condition change, or at predetermined time intervals to check the present object system condition 1a and control condition 10b, and selects an information service item 201a to be presently supplied.

(b) Content determination means 202 determines and provides a specific information content 202a, expression and the like of the selected item in dependence upon the present condition of the object system 1, predicted future estimation values and the like.

(c) Information service execution means 203 supplies the service information and external information (news, weather prediction or the like) stored in the external information data base 80 to a system participant 90 by means of the display 50, voice synthesizer 60 or the like while considering the output timing thereof.

The knowledge editor 70 introduces and edits empirical rules regarding the control and information service in the form of the fuzzy knowledge base. The fuzzy knowledge base is organized into the following four hierarchies:

(a) Fuzzy meaning base: the meaning of propositions each composed of a subject and a predictive value are defined by fuzzy sets.

(b) Fuzzy control rule: experts' empirical rules of control are formulated using the propositions defined by the fuzzy meaning base.

(c) Fuzzy information service rule: empirical rules for information service are formulated in a similar manner to that of the control rule.

(d) Object model base: a dynamic model of the object system necessary for estimation or evaluation of each rule is defined.

The following description is directed to an embodiment of an elevator group supervisory system according to the present invention.

Buildings in cities have become large scaled and complicated and are nowadays provided with highly sophisticated information and intelligence. The complicated and enormous flow of persons within a building can be regulated safely, comfortably and efficiently with an elevator system, the main system of which is an elevator group supervisory system which uses four to eight elevators and assigns a proper elevator to a call request at each hall.

Figure 4:
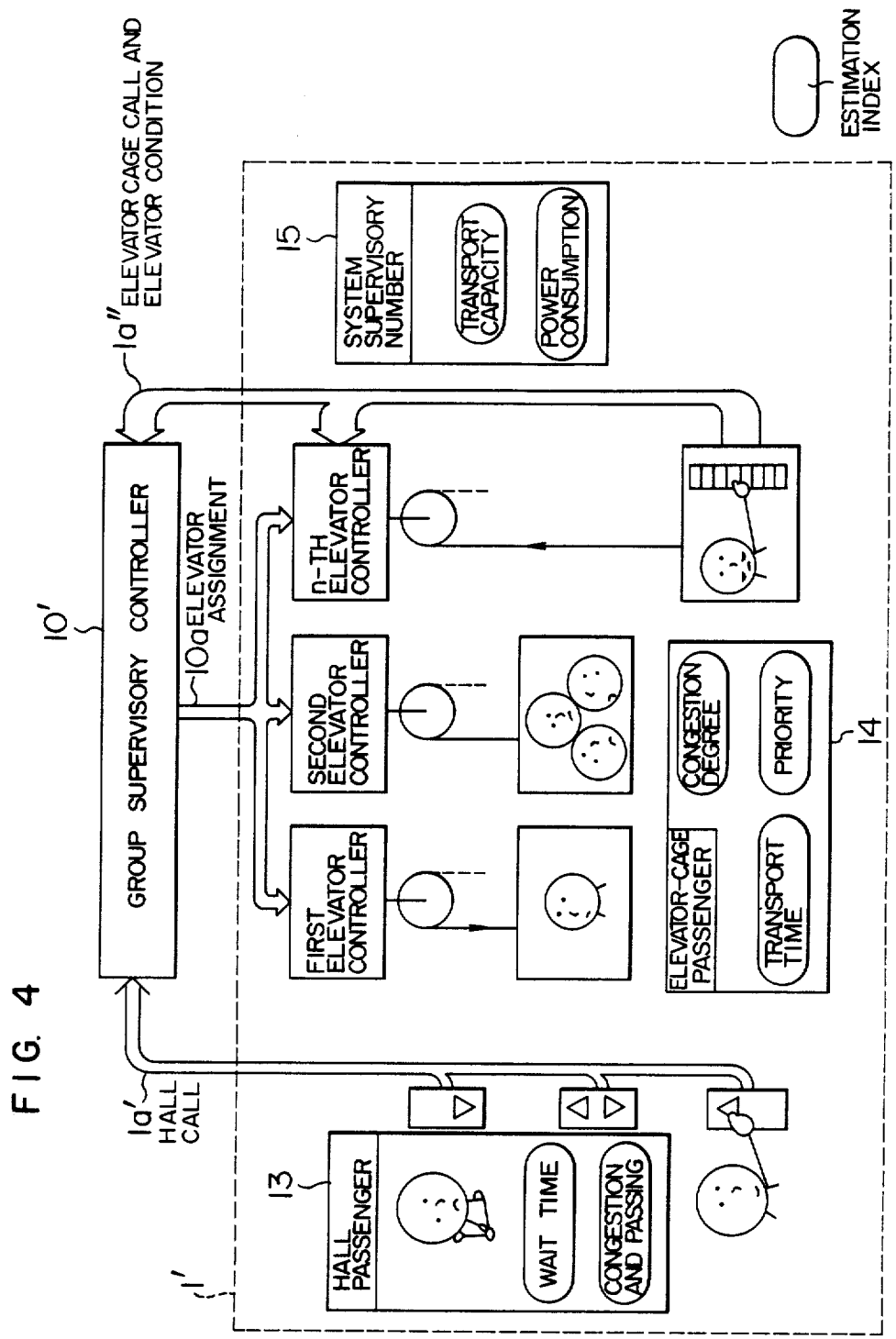
FIG. 4 shows the outline of an elevator group supervisory system.

The outline of such an elevator group supervisory system is shown in FIG. 4. A group supervision controller 10' receives a hall call signal 1a' from a hall passenger 13, an elevator call signal and an elevator condition signal 1a" from an elevator-cage passenger 14 to thereby perform elevator assignment control by using as estimation indices a predicted wait time by a hall passenger 13, the congestion degree of cage passengers 14 and the like.

For hall passengers 13 and cage passengers 14 the status information and the like which are given by an elevator operator are effective in improving mental ease and comfort of the passengers. In view of this, such information service rules are prepared to serve in cooperative association with fuzzy control rules of elevator group supervision, to thereby provide a voice information service and/or a character display.

Figure 5:
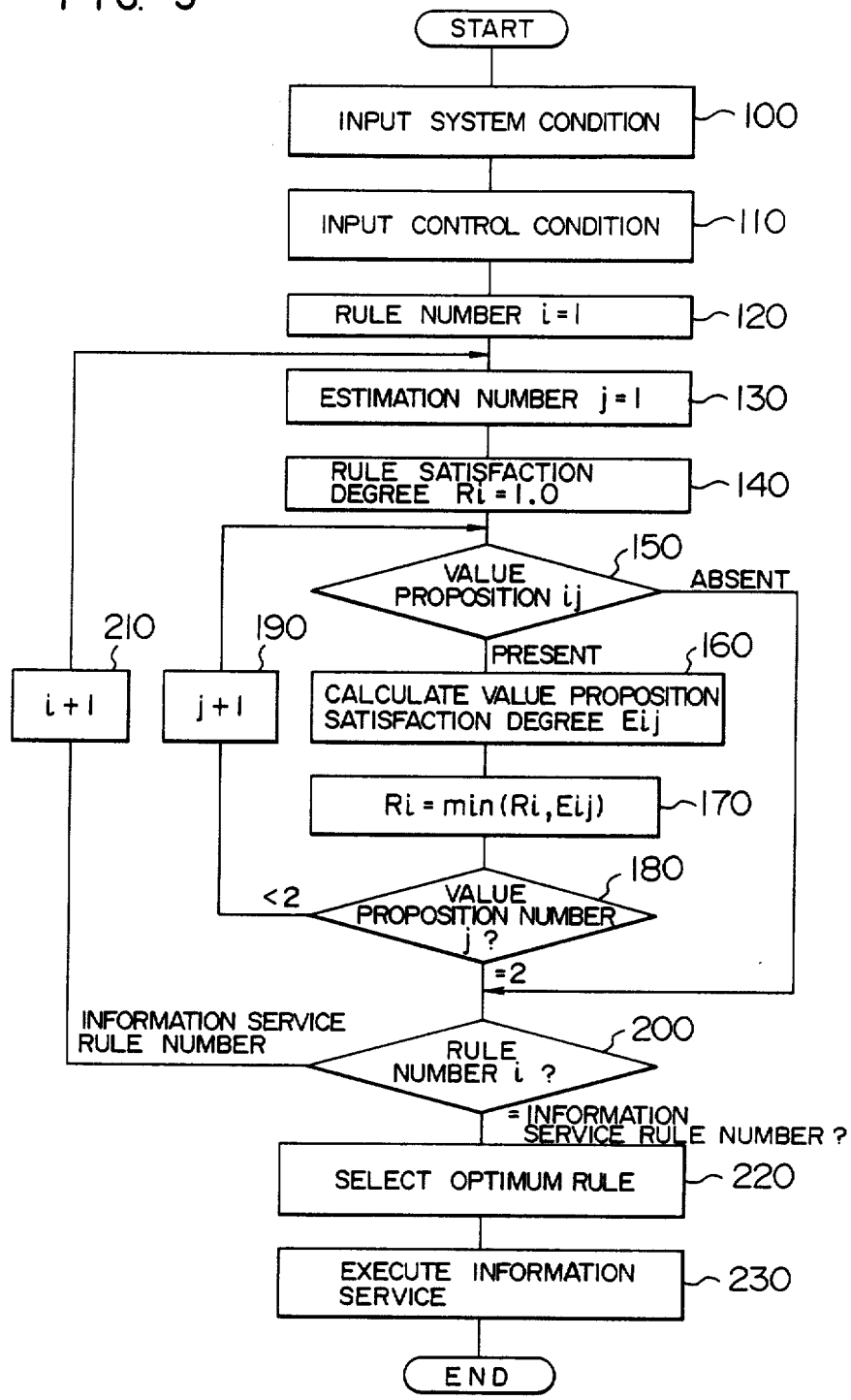
FIG. 5 is a flow chart illustrating the procedure performed by an information service controller 20 shown in FIG. 1.

FIG. 5 is a flow chart showing the procedure performed by the information service controller 20 constructed of a microcomputer and the like. FIG. 6 shows the contents of an information service rule number table 31 and information service rule table 32 provided in the information 25 service rule storage 30. The information service rules shown in FIG. 6 are the following four check rules:

Rule No. 1: if the wait time is immediately after a call request and the predicted wait time is proper, then identify an assigned elevator.

Rule No. 2: If the wait time is short and the predicted wait time is short, then identify a coming elevator.

Rule No. 3: If the wait time is long and the predicted wait time is short, then announce "sorry for waiting" and identify a coming elevator Rule No. 4: If the wait time is immediately after a call request and the predicted wait time is long, then announce "now congested" and identify an assigned elevator These rules are used for hall passengers who have pushed a call button. In FIG. 6, the "wait time" in the column of the first estimation or value proposition refers to a lapse time from a call request time to the present time. The "immediately after call request" indicates the system condition for a lapse time from a call request time to the present time an above if check has been just made, namely, the wait time or lapse time is very short. The "predicted wait time" in the column of the second estimation (value) proposition means a predicted time from the present time to the time when an elevator comes to the floor now concerned, and is predicted by the controller 10'. Each of the estimation indices in the If portion of the rule table 32 is called an estimation (value) proposition which is defined by fuzzy sets. FIG. 7 shows as an example of a membership function the content of one of the estimation (value) propositions, "long wait time", stored in the service rule storage 30. This value proposition is defined by a fuzzy set of a membership function $\nu A(t)$ which expresses the membership degree to which a person feels that a wait time t is long by a value from 0.0 to 1.0. Other estimation (value) propositions are defined similarly and stored in the table.

The operation of the embodiment will be described in conjunction with the process flow chart shown in FIG. 5. The process program in the information service controller 20 is initiated at the occurrence of a hall passenger call or an elevator cage passenger call, and hereafter at predetermined time intervals (e.g., every one second). First, the system condition, such as a wait time at a concerned hall, is inputted (step 100). Next, a control condition, such as a predicted wait time until an elevator comes to the hall, is inputted (step 110). Then the information service rule number i to be estimated is set at 1 (step 120), and the number j of the estimation proposition is set at 1 (step 130). Next, the satisfaction degree Ri of the presently estimated rule number i is set at 1.0 (step 140). It is then checked to determine if the j-th estimation proposition of the rule number i is present or not. If not present, the estimation of the rule number i is terminated to jump to step 200. Alternatively, if present, an estimation proposition satisfaction degree Eij is obtained using the membership function as shown in FIG. 7. For example, in case of a long wait time, a value of from 0.0 to 1.0 is obtained (step 160) in accordance with:

$$E_{ij} = \nu A(t) \tag{1}$$

where t is the wait time Next, a minimum value among the values of satisfaction degrees Ri and Eij of the preceding rule numbers i and rule propositions j is selected to use it as a new satisfaction degree Ri of the rule number i, thus Ri=min (Ri, Eij) (step 170). Next, the estimation proposition number j is checked to determine if it is a maximum value (in this embodiment, the maximum value being equal to 2). If not, 1 is added to j to jump to step 150 (step 190). If the proposition number j reaches the maximum value (i.e., j=2) at step 180, the rule number i is checked (step 200). If the number i is smaller than a maximum information service rule number (in this embodiment, it being equal to 4), 1 is added to i to jump to step 130 (step 210). If the rule number i reaches the maximum information service rule number (i.e., i=4) at step 200, a rule k is selected which gives a maximum satisfaction degree among the rule satisfaction degrees Ri, where i=1 to 4 (step 220). Next, the information service content indicated by the k-th information service rule is outputted to the display 50 and/or the voice synthesizer 60. The voice from the voice synthesizer 60 is arranged to be outputted only when the information service content changes, to thereby avoid repetitive voice outputting of the same information.

According to the present invention, it is possible to provide proper information based on rules of information services performed by human operators while estimating the object system condition and control condition, thus enabling provision of comfortable automatic information services.

In the above embodiment, the operation of the information service system has been described with respect to information services provided to hall passengers in elevator systems, However, such information services are also possible for elevator cage passengers, elevator supervisory members and the like. The invention is further applicable to the following uses.

(1) Train operation system: Information is supplied to passengers in trains and other passengers on platforms while estimating the train operation condition in accordance with information service rules In case of automatic operation, information on the control condition is also considered in supplying information service. It is also possible to supply information on operation or failure conditions of apparatuses to the train driver and the like.

(2) Process control system: For control of a dose of chemicals in a water cleaning bed, of operation of a cement kiln, of a blast furnace, and the like, information service to the operator and supervisory members can be realized based on information service rules while estimating the automatic or manual operation condition.

(3) Cash dispenser and the like: The invention is effectively applied to the cash dispenser and the like to be operated by an unskilled person. The person given information service in accordance with information service rules can operate the machine with mental comfort.

What is claimed is:

1. An information service system which supplies a predetermined information to a participant using an object system, comprising:
control rule storage means for transforming intellectual activities regarding control rules for said object system into a first algorithmic form for storage as a control knowledge base;
object system control means connected to said object system and said control rule storage means, for detecting a present condition of said object system, calculating with said condition in dependence upon said control knowledge base and controlling said object system in accordance with result of the calculation;
information service rule storage means for transforming intellectual activities regarding information services to said participant into a second algorithmic form for storage as information knowledge base;
information storage means for storing as an information data base internal information regarding said object system and external information including news or weather predictions;
information service control means connected to said object system, said object system control means, said information service rule storage means and said information storage means, for detecting the condition of said object system and control condition of said object system control means, for calculating with said conditions in dependence upon said information knowledge base, for selecting a most suitable information for said participant from said information storage means in accordance with result of the calculation, and for outputting said most suitable information; and
information display means for notifying said system participant of information corresponding to said most suitable information from said information service control means.

2. A system according to claim 1, wherein said control rule storage means stores empirical-knowledge derived from control knowledge of human individuals for said object system, and said information service rule storage means stores empirical knowledge derived from information service knowledge of human individuals for said object system, the respective storage of the empirical knowledge defining a fuzzy knowledge base.

3. A system according to claim 2, wherein said fuzzy knowledge base comprises:
a fuzzy meaning base wherein meanings of propositions each composed of a subject and a predictive are defined by fuzzy sets;
a fuzzy control rule for expressing expert's empirical rules for the control of said object system using propositions defined by said fuzzy meaning base;
a fuzzy information service rule for expressing expert's empirical rules for predetermined information services by using propositions defined by said fuzzy meaning base;
an object model base wherein a dynamic model of said object system necessary for estimation of each of said fuzzy control rule and fuzzy information service rule is defined; and
wherein said object system control means and said information service control means perform fuzzy controls in dependence upon said fuzzy knowledge base.

4. A system according to claim 2, wherein said object system control means performs predictive fuzzy control.

5. A system according to claim 2, wherein said control rule storage means stores, as a control knowledge base, qualitative characteristics of said object system determined from expert's experiences in operation of said object system.

6. A system according to claim 5, wherein said object system control means operate in dependence upon said control knowledge base and comprises:
control object estimation means for fetching and storing data of the present condition of said object system and said control condition of said object system control means, comparing them with those stored previously to detect possible changes in structural and system parameters which represent said condition data, and outputting signals indicating any detected parameter changes;

control plan determination means for fetching and storing data of the present condition of said object system, said control condition and said system parameters change signals, predicting executable control plans and preestimating controlled results of said plans in dependence upon comparison of the fetched data and data stored previously to determine an optimum control plan among said control plans; and control execution means for fetching data of the present condition of said object system and data of said optimum control plan, determining and outputting instructions to control said object system in response to the fetched data of said present condition and said optimum control plan.

7. A system according to claim 2, wherein said information service rule storage means stores, as an information service knowledge base, qualitative data of information services which could be supplied by experts to said system participant.

8. A system according to claim 7, wherein said information service control means operate in dependence upon said information service knowledge base and comprise:

item selection means for fetching the present condition of said object system and said control condition, and checking the fetched conditions at the occurrence of an event or change in said control condition or at predetermined time intervals to select an information service item to be presently supplied;

content determination means for fetching the present condition of said object system, said control condition and said information service item to predict a future condition of said object system, and determining and outputting information of a particular content and expression form of said information service item as an information guidance output on the basis of the predicted future condition; and information service execution means for fetching the present condition of said object system and said information guidance output to output information from said information storage means to said information display means and to select a timing for outputting the information.

9. A system according to claim 1, wherein said object system is an elevator group supervisory system.

10. A system according to claim 1, wherein said object system is a train operation system.

11. A system according to claim 1, wherein said object system is a process control system.

12. A system according to claim 1, wherein said object system is a cash dispenser system.

13. An information service system which supplies predetermined information to a participant to an object system controlled in accordance with predetermined control rules, comprising:

information service rule storage means for transforming intellectual activities regarding information services to said participant into an algorithmic form, and storing data of the algorithmic form as an information knowledge base;

information storage means for storing, as an information knowledge data base, internal information regarding said object system and external information including news and weather predictions;

information service control means for fetching the condition of said object system, calculating with the fetched condition in dependence upon said information knowledge base, selecting the most suitable information for said participant from said information storage means in accordance with the result of the calculation, and outputting said most suitable information; and information display means for notifying said system participant of information corresponding to said most suitable information from said information service control means.

14. A system according to claim 13, wherein said information service control means fetches said present condition of said object system, estimates the fetched present condition and past condition of said object system as a membership degree of each fuzzy set, calculates membership degree by use of said information knowledge base, and selects an optimum information from said information storage means and outputs said optimum information to said participant in accordance with result of the calculation.

15. A system according to claim 14, wherein said information service control means estimates a control condition of a control unit controlling said object system as the membership degree of each fuzzy set.

16. An information service system which provides information service by calculating with amounts of condition of an object system at a given time in accordance with a given algorithm and determining an information service item to be provided, wherein the condition at said time and a past condition of said object system are estimated as a membership degree of each fuzzy set, and said information service is determined in accordance with predetermined information service rules.

17. A system according to claim 16, wherein a control device is provided to operate said object system automatically in accordance with states the control device, which are taken into account for the estimation of the membership degree of each fuzzy set.

* * * * *